United States Patent

Salemi

[15] 3,707,234
[45] Dec. 26, 1972

[54] SUPPORT MODULE FOR REVERSE OSMOSIS MEMBRANE

[72] Inventor: Nicholas A. Salemi, Pittsburgh, Pa.

[73] Assignee: Westinghouse Electric Corporation, Pittsburgh, Pa.

[22] Filed: May 4, 1971

[21] Appl. No.: 140,179

[52] U.S. Cl. .................................210/321, 210/433
[51] Int. Cl. ...........................................B01d 31/00
[58] Field of Search..............210/321, 336, 433, 488

[56] References Cited

UNITED STATES PATENTS 3,563,388  2/1971  Briggs...............................210/488 X
3,610,418  10/1971  Calderwood......................210/433 X

*Primary Examiner*—Frank A. Spear, Jr.
*Attorney*—A. T. Stratton and F. P. Lyle

[57] ABSTRACT

A support module for semipermeable tubular osmotic membranes formed from a stack of discs, which have a plurality of holes which register with holes in adjacent discs, the faces of the discs are rough to provide passageways for fluid to flow between adjacent discs, lengthwise welds form the discs in a rigid stack and cover plates, fastened to the end plates of the stack, have a series of grooves, which are disposed to place the tubular osmotic membranes disposed within the support module in series.

7 Claims, 3 Drawing Figures

3,707,234

PATENTED DEC 26 1972

SUPPORT MODULE FOR REVERSE OSMOSIS MEMBRANE

BACKGROUND OF THE INVENTION

This invention relates to a reverse osmosis module and more particularly to the support for the tubular osmotic membranes which form the module.

Certain membranes, i.e., cellulose acetate, will act as osmotic membranes in reverse and allow solvent to pass through the membrane and separate from the influent liquid having a high concentration of dissolved solids when the influent liquid is pressurized to a pressure greater than the osmotic pressure of the influent liquid. When brine is the influent liquid the solvent, water, which passes through the membrane has a sufficiently low concentration of dissolved solids to be potable. The osmotic membranes are delicate and would rupture when subjected to the pressure differential necessary to produce the reverse osmotic flow if they were not supported over their entire surface area. Thus, it is necessary to supply a structure which will support the entire surface area of the membrane and yet allow liquid to seep through the membrane. The osmotic membranes are assembled in modules and a plurality of modules are used to form a reverse osmosis unit as each membrane must undergo close inspection and tests for a single pinhole could render the product from the entire unit unsuitable for use.

Bonded sand support structures have been utilized successfully to support the osmotic membranes, however, not without difficulties. Cracks in the sand support structure are often caused by improper filling of the molds, shrinkage during curing and excessive porosity of the sand. The cracks may permit the membranes to rupture rendering the product unsuitable for use. For further information on reverse osmosis, reference may be made to copending applications Ser. No. 754,581 filed Aug. 22, 1968, now U.S. Pat. No. 3,598,241, and Ser. No. 855,491 filed Sept. 5, 1969, 1969, now U.S. Pat. No. 3,610,418, and assigned to the same assignee as this application.

SUMMARY OF THE INVENTION

In general, a reverse osmosis module made in accordance with this invention comprises a plurality of semi-permeable tubular osmotic membranes; an influent conduit for supplying pressurized influent liquid to the inside of the tubular osmotic membranes; a drain conduit for draining purified liquid from the outside of the tubular osmotic membranes; and a support structure for supporting the tubular osmotic membranes to prevent rupture from internal pressure. The support structure comprises a plurality of plates fastened together to form a rigid stack. Each plate has a plurality of holes which register with holes in adjacent plates, and the tubular osmotic membranes are disposed in these holes. Adjacent plates have sufficient spacing therebetween to pass liquid from the tubular osmotic membranes to the drain conduit.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
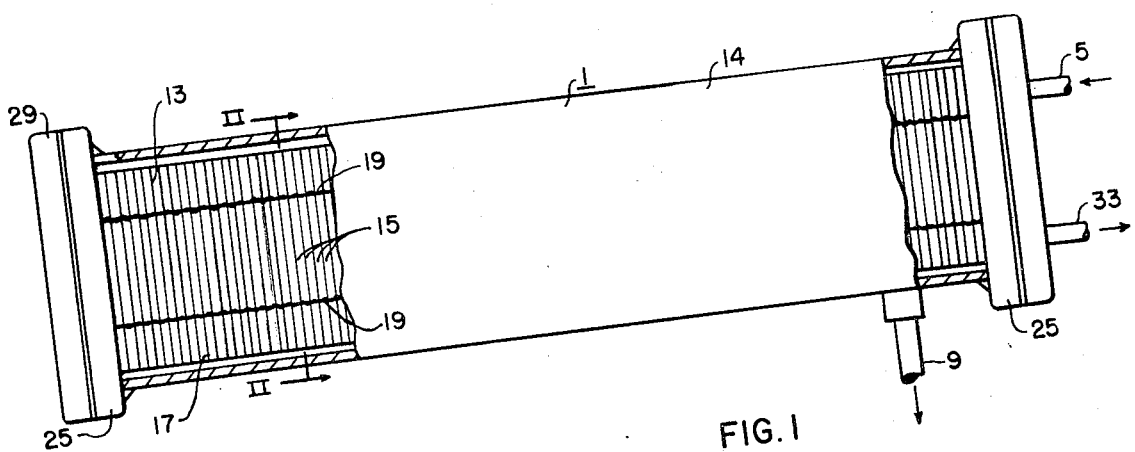
FIG. 1 is a partial sectional view of a reverse osmosis module made in accordance with this invention.
Figure 2:
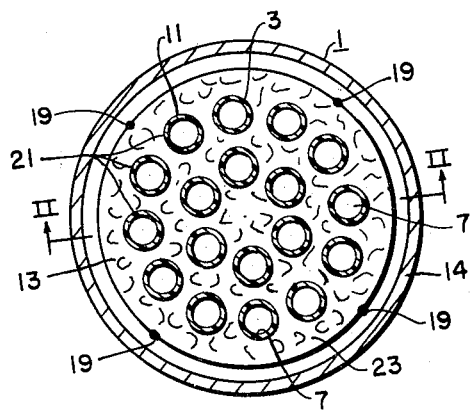
FIG. 2 is an enlarged sectional view taken on line II-II of FIG. 1.

Referring now to the drawings in detail, FIG. 1 shows a reverse osmosis module 1 for semipermeable tubular osmotic membranes 3, made of cellulose acetate or other semipermeable materials. The module comprises a supply conduit 5 for supplying pressurized influent liquid, such as brine, having a high concentration of dissolved solids to one side, the inside, 7 of the tubular osmotic membrane 3, a drain conduit 9 for draining purified liquid from the other side, the outside, 11 of the tubular osmotic membrane 3, a support structure 13 to prevent the membrane from rupturing due to the internal pressure necessary to provide the driving force for the reverse osmosis process, and a container 14 enclosing the support structure and collecting the purified liquid or potable water.

The support structure comprises a plurality of plates or discs 15 of weldable material fastened together to form a rigid stack 17 by welding beads 19 extending lengthwise of the stack. The discs 15 have a plurality of holes 21 which register with holes in adjacent discs. The tubular osmotic membranes 3 are disposed in the holes 21. The major surfaces 23 of the discs are coined, knurled or are sufficiently rough to provide fluid passageways between adjacent plates for fluid, which passes through the tubular osmotic membranes 3.

Figure 3:
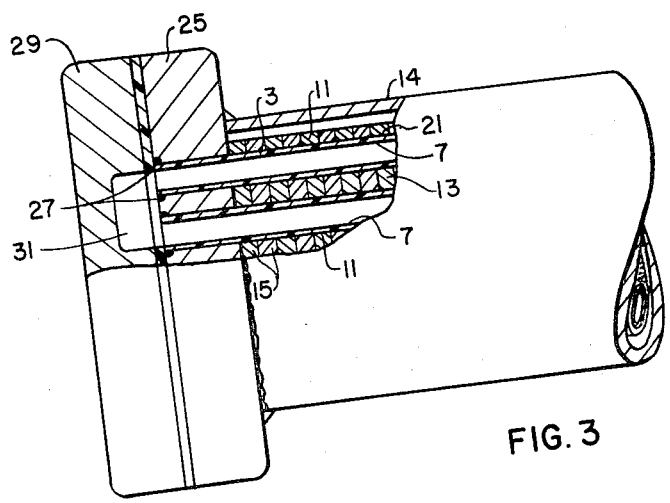
FIG. 3 is a partial sectional view showing a cover plate for the reverse osmosis module.

The plates or discs at each end 25 of the stack have a larger perimeter or diameter and are thicker than the other plates or discs 15 in the stack. As shown in FIG. 3, the tubular osmotic membranes are sealed to the outer margins of the hole 21 in the end plates by a sealant 27, such as resilient grommets or epoxy.

The container 14, as shown in FIG. 1, is a tubular shell enwrapping the support structure 13 and is seal welded to the end plates or discs 25. The drain conduit 9 extends through the shell and extends from one end thereof adjacent the bottom.

Cover plates 29 are fastened to the end plates 25. As shown in FIG. 3, the cover plates have a plurality of grooves 31 disposed to place its osmotic membranes in series and to provide series flow through all the tubular osmotic membranes disposed within the support structure. The influent supply conduit 5 extends through one cover plate to supply pressurized liquid to the inside 7 of the tubular osmotic membranes 3 and initiate series flow therethrough. An effluent fluid conduit 33 also extends through one cover plate to drain off liquid which has passed through the tubular osmotic membranes and has a high concentration of dissolved solids and precipitates. The effluent liquid flowing through the effluent conduit 33 flows to waste. The flow through the effluent conduit is regulated to insure adequate removal of precipitates and to minimize the rate of flow to waste. Forming the support structure of discs made of weldable material and running a plurality of welds longitudinally along the stack provides a very rigid support for the osmotic membrane and forms a support in the shape which may be easily enclosed in a tubular shell to form a completely enclosed module in which the tubular osmotic membranes will not rupture due to defects in the support structure.

What is claimed is:

1. A reverse osmosis module for semipermeable tubular osmotic membranes, said module comprising means for supplying pressurized influent liquid to on side of said tubular osmotic membranes, means for draining purified liquid from the other side of said tubular osmotic membranes and support means for supporting said membranes to prevent rupture of said tubular membranes from internal pressure, said support means comprising a plurality of plates fastened together to form a rigid stack of said plates, said plates having a plurality of holes which register with holes in adjacent plates, said tubular osmotic membranes being disposed in said holes, adjacent plates having sufficient spacing therebetween to pass liquid from said tubular membranes to said drain means.

2. A reverse osmosis module as set forth in claim 1, wherein the plates have major surfaces, which are sufficiently rough to provide fluid passageways between adjacent plates.

3. A reverse osmosis module as set forth in claim 1, wherein the plates are discs.

4. A reverse osmosis module as set forth in claim 1, wherein the plates are discs and the discs at the end of the stack are larger in diameter than the other discs forming the stack and the reverse osmosis module further comprises cover plates which are fastened to said end discs, the cover plates having a plurality of grooves therein disposed to place the tubular osmotic membranes in series, to provide series flow through all membranes disposed within the reverse osmosis module.

5. A reverse osmosis module as set forth in claim 1, wherein the plates at each end of the stack have a larger perimeter than the other plates in the stack, and the reverse osmosis module further comprises a tubular shell disposed between said end plates and sealed thereto to form a water tight enclosure around the stack, said tubular shell having a port providing the means for draining purified liquid which has passed through the tubular osmotic membranes from said shell.

6. A reverse osmosis module as set forth in claim 1, wherein the plates are fastened together by a plurality of welds extending lengthwise of the stack.

7. A support module as set forth in claim 1, wherein the plates at each end of the stack have a larger perimeter than the other plates in the stack, and said end plates are thicker than the other plates in the stack, the tubular osmotic membranes being sealed to the outer margins of the holes in the end plates and the reverse osmosis module further comprises cover plates fastened to the end plates, said cover plates having a plurality of grooves therein disposed to place the tubular osmotic membranes in series to provide series flow through the osmotic membranes disposed with the reverse osmosis module.

* * * * *